Patented Jan. 2, 1951

2,536,038

UNITED STATES PATENT OFFICE 2,536,038

TETRAHYDROCAFFEINE AND PROCESS FOR PREPARING SAME

Frederick Comte, Kirkwood, Mo., assignor to Monsanto Chemical Company, St. Louis, Mo., a corporation of Delaware No Drawing. Application April 18, 1949, Serial No. 88,235

5 Claims. (Cl. 260—256)

This invention relates to new chemical compounds, namely tetrahydrocaffeine having the formula

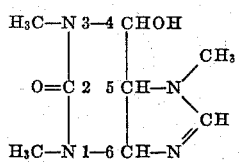

and its salts.

Tetrahydrocaffeine has been found to be an exceedingly versatile compound having a wide variety of utilities in totally unrelated fields. For example, it is of considerable interest as a fungicide, bactericide and insecticide. It has been found to have utility as a "brightening" agent in metal plating baths. As a gas-fading inhibitor for dyed fabrics, it is outstanding. Cellulose acetate fabrics impregnated with tetrahydrocaffeine and dyed with standard and inherently unstable blue dyes exhibit negligible color change or fading on prolonged exposures to an atmosphere saturated with combustion gases containing the particularly deleterious nitrous oxide.

The novel compound of this invention may conveniently be prepared by the reduction of 5,6-diamino-uracil sulfate to 5,6-diamino-tetrahydrouracil sulfate, formylation of the 5,6-diamino-tetrahydrouracil sulfate for formic acid to form 5-amino-6-formamido-tetrahydrouracil, methylation of the 5-amino-6-formamido-tetrahydrouracil with methyl chloride while maintaining a pH greater than about 7.5 and recovering the substantially pure tetrahydrocaffeine thus formed. Preferably the reduction of 5,6-diamino-uracil sulfate is carried out at room temperature or a temperature of the order of 30° C. utilizing zinc and formic acid. A nickel-magnesium alloy may be used in place of the zinc. The formylation of 5,6-diamino-tetrahydrouracil sulfate has been found to be best carried out with formic acid at a temperature of about 100° C. It is preferred that the methylation of 5-amino-6-formamido-tetrahydrouracil and the simultaneous ring closure to form tetrahydrocaffeine be accomplished by methylation with methyl chloride under a pressure of about 50 to 100 pounds per square inch at a temperature of about 100° C. and while maintaining a pH of about 10.0 by the addition of sodium hydroxide to the reaction mass. Tetrahydrocaffeine may be conveniently recovered from the reaction mass by crystallization. The following example is illustrative of a manner in which the novel compound of this invention may be prepared:

76.5 g. of dry 5,6-diamino-uracil sulfate, 76.5 ml. of water and 310 ml. of a 2% formic acid solution were charged to a glass reactor equipped with a thermometer, agitator and reflux condenser. With continuous agitation and at a temperature of about 30° C., 7.65 g. of zinc dust and 10.6 ml. of an 85% formic acid solution were slowly added. 28.6 g. of sodium formate was then added and the reaction mixture refluxed for about four hours. The reaction mixture was then filtered and the filter cake washed with water. This solid material was composed of predominantly 5-amino-6-formamido-tetrahydrouracil.

55 g. of the above described dry crude 5-amino-6-formamido-tetrahydrouracil was then added to 490 ml. of water in an autoclave. With continuous agitation and at a temperature of about 90° C., the material was methylated with methyl chloride under 70 pounds per square inch pressure with continuous addition of a 49% aqueous solution of sodium hydroxide so as to maintain a pH above about 7.5 and preferably about 10. Methylation was continued for about eight hours after which time the reaction mixture was allowed to cool causing the crystallization of tetrahydrocaffeine. The crystals were filtered and recrystallized from hot water thereby obtaining substantially pure tetrahydrocaffeine. The mother liquor from the methylation reaction was extracted with chloroform to obtain an additional quantity of tetrahydrocaffeine which also contained a small quantity of caffeine. The tetrahydrocaffeine was isolated by the fractional crystallization of its hydrochloride. The crystals of tetrahydrocaffeine thus obtained were added to that material crystallized directly from the methylation reaction mixture, thereby obtaining an excellent total yield of substantially pure tetrahydrocaffeine.

The large, white, hexagonal prisms of tetrahydrocaffeine thus obtained had a melting point of 195°–196° C., were soluble in alcohol and chloroform and soluble in water to the extent of about 1% at room temperature and about 9% at about 100° C. Tetrahydrocaffeine was found to be a weak base, forming stable salts with mineral acids such as sulfuric acid and hydrochloric acid. The tetrahydrocaffeine hydrochloride melted at 245°–246° C. with decomposition.

What is claimed is:

1. As new chemical compounds, compounds selected from the group consisting of tetrahydrocaffeine and its acid salts.

2. Tetrahydrocaffeine.

3. Tetrahydrocaffeine hydrochloride.

4. A process for the production of tetrahydrocaffeine comprising the reduction of 5,6-diaminouracil sulfate to 5,6-diamino-tetrahydrouracil sulfate, formylation of the 5,6-diamino-tetrahydrouracil sulfate with formic acid to form 5-amino-6-formamido-tetrahydrouracil, methylation of the 5-amino-6-formamido-tetrahydrouracil with methyl chloride while maintaining a pH greater than about 7.5, and recovering substantially pure tetrahydrocaffeine.

5. A process for the production of tetrahydrocaffeine comprising the reduction of 5,6-diaminouracil sulfate with zinc and formic acid at a temperature of about 30° C. to form 5,6-diamino-tetrahydrouracil sulfate, formylation of the 5,6-diamino-tetrahydrouracil sulfate with formic acid at a temperature of about 100° C. to form 5-amino-6-formamido-tetrahydrouracil, methylation of the 5-amino-6-formamido-tetrahydrouracil with methyl chloride at a pressure in the range of about 50 to 100 pounds per square inch and a temperature of about 100° C. while maintaining a pH of about 10 by the addition of sodium hydroxide, and recovering substantially pure tetrahydrocaffeine.

FREDERICK COMTE.

No references cited.